UNITED STATES PATENT OFFICE.

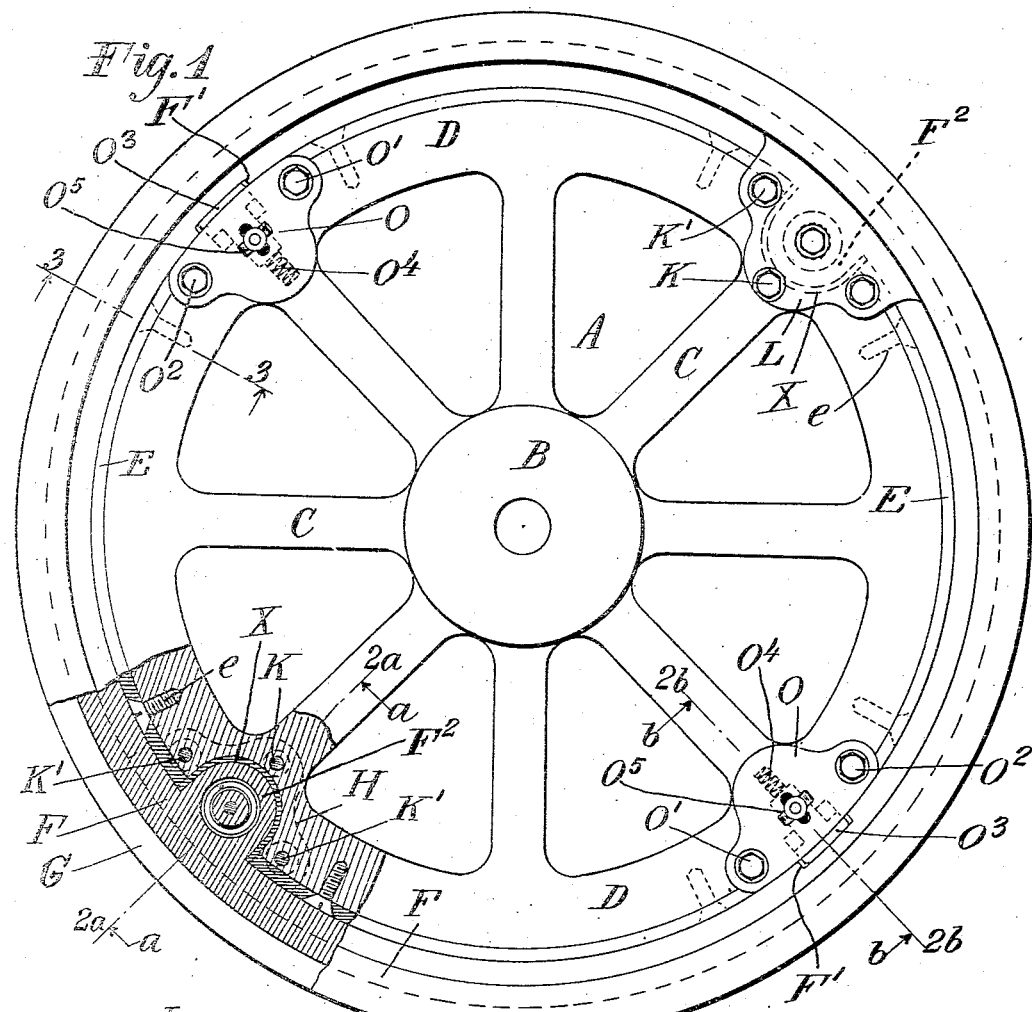
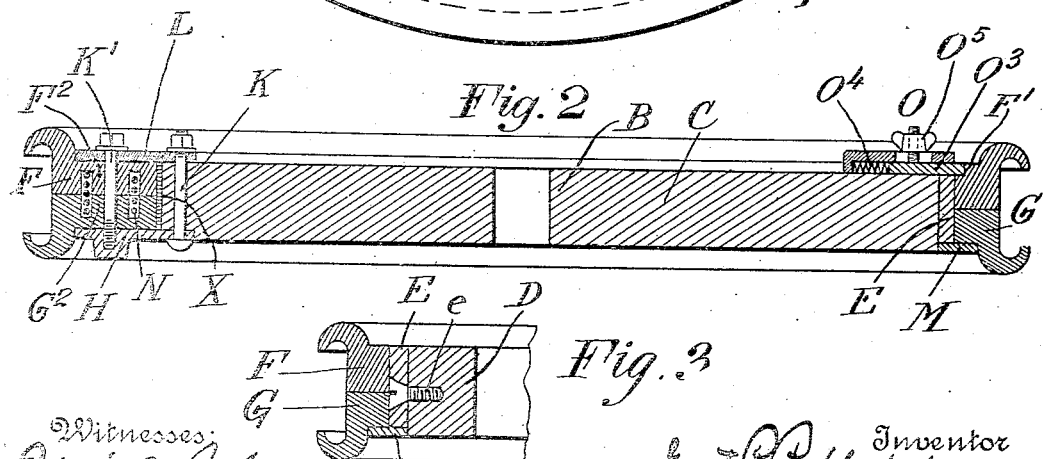

GUST P. PAPPADAKES, OF NEW YORK, N. Y.

AUTOMOBILE-WHEEL AND RIM.

1,069,025.   Specification of Letters Patent.   Patented July 29, 1913.

Application filed December 2, 1912. Serial No. 734,500.

*To all whom it may concern:*

Be it known that I, GUST P. PAPPADAKES, a subject of the King of Greece, residing in the borough of Manhattan, in the city, county, and State of New York, have invented certain new and useful Improvements in Automobile-Wheels and Rims, of which the following is a specification.

The invention relates to wheels and rims, and one object of the invention is to construct an automobile wheel which permits the ready removal therefrom and the ready replacement thereupon of a pneumatic or other yieldable tire.

Another object of the invention is to construct a rim which will comprise outer rings or tire retaining annular sections which can be clamped tightly together by members passing therethrough.

A further object of the invention is to provide a pair of tire supporting and retaining rings with a spring means that normally presses them apart and with means for holding them detachably secured together.

Another object of the invention is to provide a wheel with a flanged abutment on one side face of the wheel and with a latch or latches on the other side face of the wheel for locking between the flanged abutment and the latch or latches a pair of tire holding sections which are normally pressed apart by strong spring means therebetween.

The invention also relates to other features which together with the features above enumerated are clearly set forth in the appending claims.

As showing a specific embodiment of the invention, reference is made to the drawing forming a part of this specification, in which—

Figure 1 is a side view of a wheel partially broken away with the tire retaining rings in place thereupon. Fig. 2 is a view showing at the left a section taken on the line $2^a$—$2^a$ of Fig. 1, looking in the direction of the arrows $a$—$a$, and showing at the right a section taken on the line $2^b$—$2^b$ of Fig. 1, looking in the direction of the arrows $b$—$b$, and Fig. 3 is a sectional view taken on the line 3—3 of Fig. 1.

The body or inner main portion of the wheel, which is generally made of wood, is designated by the reference character A and comprises the usual hub B, the spokes C, and the felly D. An inner metal ring E is secured to the wooden felly D as by the screws $e$. A pair of outer annular rings F and G fit on and over the inner metal ring E and are detachably secured in place by the clamping means comprising the inner clamping plate H, the bolts K and K′ and the outer clamping plate L. It will be manifest from an inspection of the drawings that the outer rings serve to support, to retain and to hold the tire in place on the wheel.

The inner side or face of the wheel is provided with an annular ring or flange member M which serves as an abutment for the outer ring G when in place on the wheel. Between the outer rings G and F there are provided compression springs H which tend to normally press the ring sections G and F apart. In order to facilitate the assembling of the outer rings G and F in place on the wheel so that they may be held in substantially the final position prior to drawing tight the bolts in the clamping means, there are provided the latches O—O which are bolted to the wooden felly D at O′—$O^2$. The movable ring engaging members $O^3$ of the latches are normally pressed radially outwardly by the spring $O^4$ and can be clamped in their outer position by the nut or thumb screw member $O^5$. From an inspection of the right hand end of Fig. 2 and also from an inspection of Fig. 1 it will be apparent that the outer end of the movable ring engaging latch member $O^3$ enters a recessed portion F′ of the ring. It will also be observed that these movable latch members $O^3$ can hold the outer rings between the abutment flange M and said latch members, while the bolts in the clamping means are either being tightened or loosened. It will furthermore be noted that the clamping bolts K pass through the wooden portion of the wheel and secure the inner and outer clamping plates H and L in place on the inner and outer faces of the wheel and that the clamping bolt K′ passes through the same two plates and also through the lugs $G^2$ and $F^2$ which are on the respective outer rings G and F. Thus this bolt K′ can serve to draw the plates H and K together whereby they can clamp therebetween the inner and outer rings and thus press the latter tightly together.

The lugs $F^2$ and $G^2$ just referred to extend radially inwardly and enter the recessed portions X—X in the inner or body portion A of the wheel. From an inspection of Fig. 1 it will be observed that the inner metal ring E is provided with depressions at these recessed portions X—X, into which depression the lugs F² and G² fit.

The improvements herein set forth are not limited to the precise construction and arrangement shown and described, as they may be embodied in various forms and modifications without departing from the spirit and scope of the invention.

What I claim is:

1. In an automobile wheel the combination of an inner member having a seat for receiving thereupon outer annular tire engaging and holding rings and also a flanged abutment which one of said rings engages, the outer tire holding or tire engaging rings thus referred to, springs between and engaging the tire holding rings tending to normally press said rings apart, a spring latching means on the opposite side of the wheel from that upon which the flanged abutment is located for locking the rings in place between the abutment and said latching means and means comprising bolts and clamping plates for holding the tire engaging sections in place.

2. In an automobile wheel the combination of an inner member having a seat for receiving thereupon outer annular tire holding rings and also a flanged portion against which one of said rings abuts, said outer tire holding or tire engaging rings, compression springs between the tire holding sections tending to normally press them apart, said springs being located outside of said metallic seat, spring latching means on the opposite side of the wheel from that upon which the flanged portion is located for locking the rings in place between the flanged portion and latching means, and means comprising bolts and clamping plates for drawing the tire engaging sections tightly together, at least part of said bolts passing through lugs on each of said tire engaging rings, which lugs extend radially inwardly.

3. In combination, a pair of annular tire supporting and retaining rings which engage the outer shoe of the tire, a compression spring between said rings, and means comprising bolts for clamping said rings together, said rings each having lugs integral therewith that extend radially inwardly, the compression spring being located between said lugs, and at least a part of the bolts passing through said lugs.

4. An automobile wheel having an inner member, annular tire engaging outer rings fitting on and over said inner member, said inner member being provided with depressions into which lugs on said tire engaging rings enter, compression springs between said lugs tending to normally force the tire engaging rings apart, and means for clamping said tire engaging rings in place on said inner member, said clamping means comprising plates that engage both the inner member and the lugs of the tire engaging rings and also comprising bolts which pass from the plates on one side of the wheel to the plates on the other side of the wheel and through said lugs, said clamping means also comprising other bolts that pass from the plates at one side of the wheel to the plates on the other side of the wheel through the inner member of the wheel.

This specification signed and witnessed this 26th day of November, A. D. 1912.

GUST P. PAPPADAKES.

Signed in the presence of—
G. McGRANN,
EDWARD A. PACKARD.

---

Copies of this patent may be obtained for five cents each, by addressing the "Commissioner of Patents, Washington, D. C."